United States Patent
Hartman

[19]

[11] Patent Number: 5,971,829
[45] Date of Patent: Oct. 26, 1999

[54] MOTORIZED ICE CREAM CONE

[76] Inventor: Richard B. Hartman, P.O. Box 228, Issaquah, Wash. 98027

[21] Appl. No.: 09/036,398

[22] Filed: Mar. 6, 1998

[51] Int. Cl.[6] ............................. A63H 33/00; B65D 85/78
[52] U.S. Cl. .............................. 446/236; 446/73; 446/76; 40/430; 426/132; 426/104
[58] Field of Search .................................. 446/71, 73, 74, 446/76, 236; 40/414, 430; 426/132, 134, 135, 104

[56] References Cited

U.S. PATENT DOCUMENTS

| | | |
|---|---|---|
| 2,162,224 | 6/1939 | Legge . |
| 2,547,651 | 4/1951 | McCrum . |
| 2,581,879 | 1/1952 | Powers . |
| 3,598,062 | 8/1971 | Weinstein . |
| 3,814,360 | 6/1974 | Samuelian et al. . |
| 4,231,496 | 11/1980 | Gilson . |
| 4,490,931 | 1/1985 | Fleemin ..................................... 40/406 |
| 4,764,850 | 8/1988 | Albanese ................................... 362/35 |
| 5,209,692 | 5/1993 | Coleman et al. . |
| 5,224,646 | 7/1993 | Biancosini . |
| 5,536,054 | 7/1996 | Liaw . |
| 5,553,643 | 9/1996 | Goldbarb et al. ........................... 141/34 |
| 5,582,532 | 12/1996 | Tucker ..................................... 446/475 |
| 5,690,535 | 11/1997 | Coleman et al. ......................... 446/236 |
| 5,736,659 | 4/1998 | Kyle, Jr. .................................... 84/95.2 |

OTHER PUBLICATIONS

*Cap Toys. 1996* product catalog, p. 14. (Cap Toys, Inc., 1996).

*Primary Examiner*—Robert A. Hafer
*Assistant Examiner*—Laura Fossum

[57] ABSTRACT

A novelty amusement eating receptacle for supporting, rotating and sculpting a portion of ice cream or similarly malleable food while it is being consumed comprising: a hand-held housing, a cup rotatably supported by the hand-held housing and adapted to receive and contain a portion of ice cream or food product of similar consistency, and a drive mechanism in the hand-held housing for imparting rotation upon the cup and rotationally feeding its contents against a person's outstretched tongue.

7 Claims, 6 Drawing Sheets

MOTORIZED ICE CREAM CONE

BACKGROUND

1. Field of Invention

This invention relates to novelty amusement eating devices, in particular, a hand-held motorized cup spinner for supporting, containing, rotating and sculpting an individual portion of ice cream or similarly malleable food while it is being consumed.

2. Discussion of Prior Art

Hand-held ice cream eating receptacles, including those commonly known as "ice cream cones," have been popular and enduring dessert items for generations. In their typical form, a cup- or cone-shaped receptacle is grasped in a person's hand in order to support and contain an individual portion of ice cream which is gradually consumed through the repeated licking actions of the person's tongue. While variations in shape, texture, material and construction abound in this category, few examples in the prior art are specifically directed at enhancing or improving the actual licking action performed by the user or the resultant effect such licking action has upon the material being consumed. U.S. Pat. No. 4,231,496 to Gilson (1980) makes known a hand-held food dispensing utensil with a vertically rotating hollow ring, which, when manipulated by a person's tongue, discharges food portions into the mouth through holes in the ring. This device is complicated to use in that it requires miniature food vessels to be inserted into the hollow ring prior to use. In addition, the repetitive task of moving one's tongue up and down to manipulate a hollow ring can become monotonous and tiring, especially for a child, thereby limiting the device's lasting appeal and play value.

U.S. Pat. No. 5,536,054 to Liaw (1996) makes known a hand-held novelty eating device for wobbling a stick upon which a piece of hardened candy has been mounted. A version of U.S. Pat. No. 5,209,692 to Coleman et al. (1993) appears in the "Cap Toys 1996" product catalog under the mark "EZ Freezy Spin Pop Shop" (Cap Toys, Inc., 1996, page 14) and makes known a hand-held motorized stick-spinning device for rotating a stick upon which a frozen lollipop has been attached. While providing novel means for manipulating and eating hardened candy or hard-frozen pops affixed to sticks, neither of these devices adequately serves as a means for consuming softer, more malleable foods such as soft ice cream, yogurt or pudding since: 1) neither device includes a cup or receptacle with walls that would serve to adequately support and contain a portion of such softer, malleable material, and, 2) such materials would not be effectively supported or contained by a stick feature alone and would consequently flow off each device onto the user's hand.

In addition to the above-mentioned disadvantages, none of the prior art examples cited above anticipates a device in which a cup mounted upon a motorized, hand-held housing is rotated so that a malleable food portion contained in the cup is rotationally fed against a person's tongue to form interesting shapes and patterns in the food portion while it is being consumed. In addition, none of the prior art examples cited anticipates that such a device would include a detachable cup that simplifies filling and cleaning of the device and permits several different cups to be used interchangeably upon a single hand-held housing, as is characteristic of the present invention. Nor do any of the prior art examples anticipate a configuration in which a hand-held motorized cup spinner is adapted to receive a common, edible pastry cone filled with ice cream so that the common cone can be consumed in the new and entertaining manner disclosed by the present invention. In addition, none of the prior art examples anticipate one embodiment of the present invention in which a hand-held motorized ice cream cup spinner is adapted to simulate the shape and feel of a traditional ice cream cone.

Because the act of eating an ice cream cone has traditionally been performed by holding a scoop of ice cream largely stationary in one's hand relative to the continuous licking movements of one's tongue, the appeal of a device that basically reverses this procedure—that is, continuously moves the ice cream portion while one's tongue is held in a relatively stationary position—has been largely overlooked. However, it can be seen that such a device is enormously entertaining, extends the natural enjoyment and creative play possibilities of eating ice cream and similarly malleable foods, and enhances the overall experience of eating such foods for young children and adults alike. Therefore, it can be seen there remains a need for a novel, hand-held cup spinner for supporting, containing, rotating and sculpting an individual portion of ice cream or similarly malleable food during consumption that can be enjoyed by children and adults alike, and facilitates new and entertaining methods for eating such foods.

OBJECTS AND ADVANTAGES

Accordingly, the objects and advantages of my invention are to provide:

(a) a novelty amusement eating device incorporating a rotating cup mounted on a hand-held housing which contains a small electric motor, drive mechanism, self-contained energy source and switch, providing a device for spinning a portion of ice cream or other malleable food contained in the rotating cup against one's tongue so that the portion is consumed and shaped in interesting new ways.

(b) a hand-held motorized cup spinner including a substantially cone-shaped housing formed to simulate the appearance of a traditional ice cream cone;

(c) a hand-held motorized cup spinner with a detachable cup that simplifies the filling and cleaning of the cup and permits several cups to be used interchangeably with a single hand-held motorized housing;

(d) a hand-held motorized cup spinner adapted to receive and support a common, edible pastry cone filled with ice cream or similar food which can be rotated to provide an entertaining new method for consuming the common pastry cone and its contents;

(e) a hand-held motorized cup spinner that facilitates the sculpting of channels with one's tongue in a rotating malleable food portion, resulting in the formation of interesting shapes and patterns on the outer surface or periphery of the food portion and creating an intriguing new activity relating to the consumption of ice cream and the like; and (f) a novel, hand-held motorized cup spinner for rotating an individual portion of ice cream or similar food product during consumption that can be enjoyed by children and adults alike, provides a new and entertaining method for eating such foods, and is relatively simple in construction and inexpensive to manufacture and use.

Further objects and advantages of my invention will become apparent from a consideration of the drawings and ensuing description of it.

REFERENCE NUMERALS IN DRAWINGS

| 20 | housing | 21 | rib |
|---|---|---|---|
| 22 | electric motor | 24 | motor drive shaft gear |
| 26 | drive mechanism | 28 | gear |
| 30 | cup mounting shaft | 32 | cup |
| 33 | drip lip | 34 | post |
| 35 | cup wall | 36 | hole |
| 38 | gear shaft | 40 | food portion |
| 41 | channel | 42 | electric circuit |
| 43 | knob | 44 | switch |
| 46 | electrical contact | 48 | connecting wire |
| 50 | battery | 52 | battery plate |
| 54 | post socket | 56 | gear shaft socket |
| 58 | removable panel | 60 | pastry cone |

DESCRIPTION—FIGS. 1, 2, 3, 4, 5, 6

Figure 1:
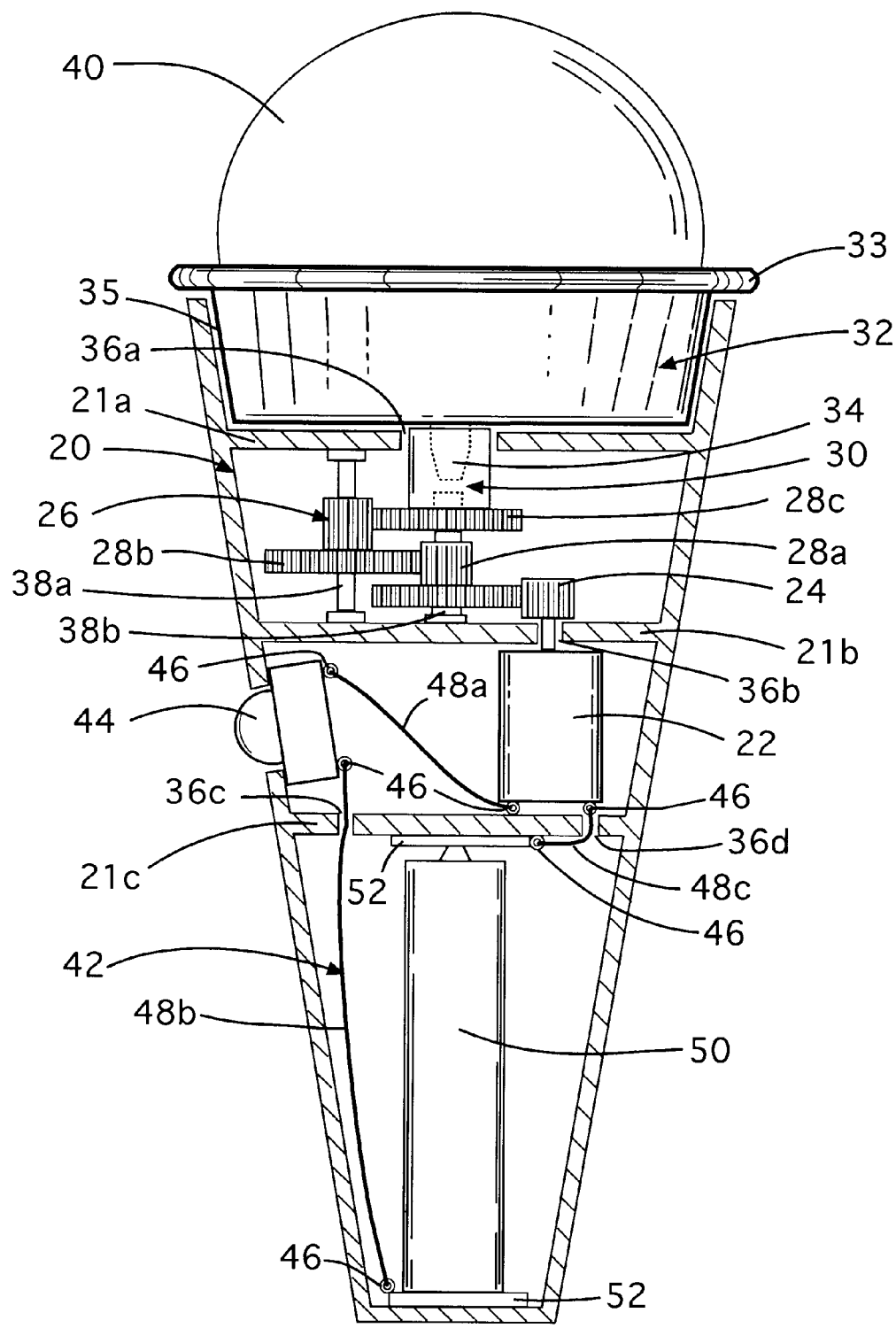
FIG. 1 is a partial cross-section view of a novelty hand-held motorized cup spinner containing a food portion, in accordance with the present invention.
Figure 2:
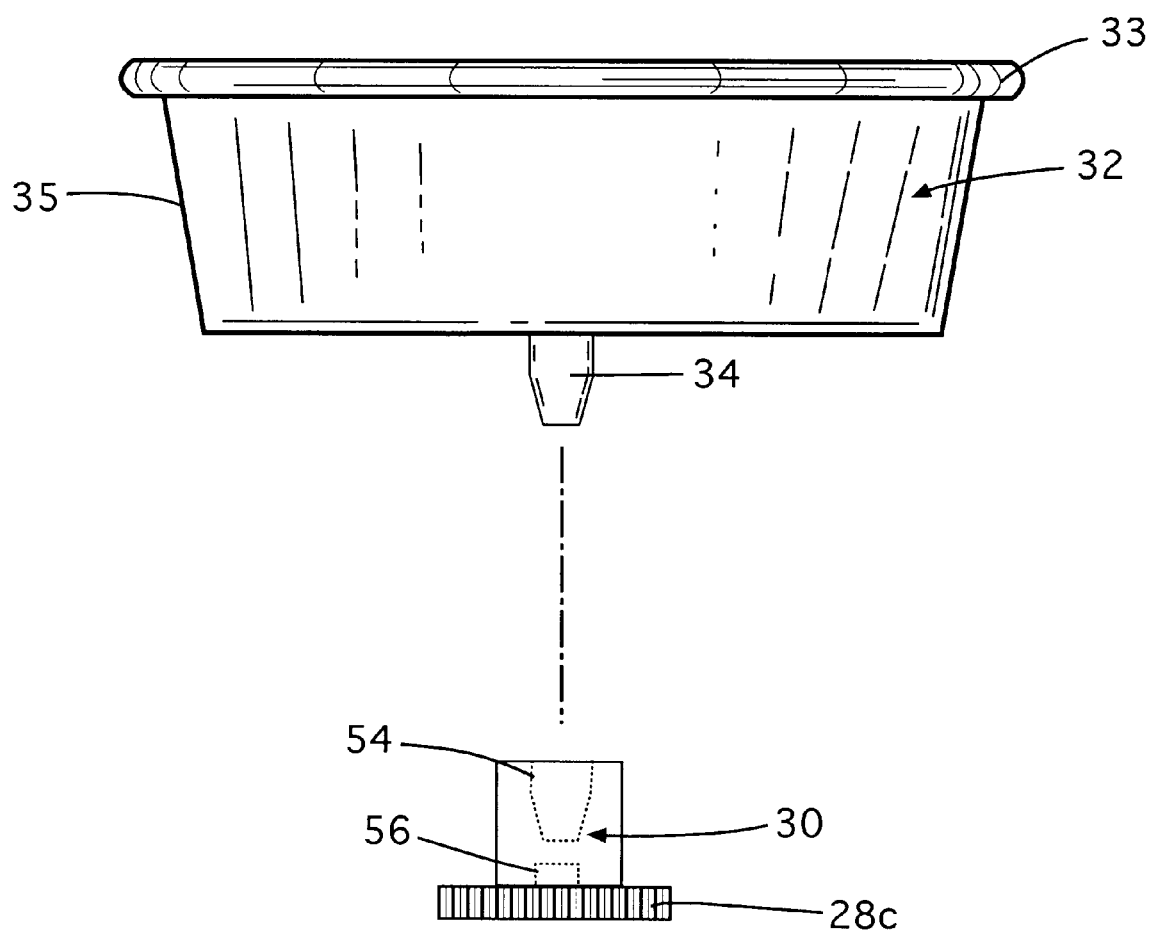
FIG. 2 is a full side view of the rotatable cup and cup mounting shaft shown in FIG. 1, indicating how a post on the bottom of the rotatable cup can be fitted inside the cup socket of the cup mounting shaft to form a tight, temporary fit.

The internal features of one preferred embodiment of the hand-held motorized cup spinner of the present invention are illustrated in FIG. 1 (partial cross-section), and FIG. 2 (full side view). The hand-held motorized cup spinner includes a substantially cone-shaped housing 20, with ribs 21a, 21b, and 21c, which support and contain an electric circuit 42, a drive mechanism 26, and a cup 32. Electric circuit 42 includes an electric motor 22, electrical contacts 46, switch 44, connecting wires 48a, 48b, and 48c, battery plates 52, and a battery 50. Connecting wires 48b and 48c pass through rib 21c at holes 36c and 36d. The shaft of motor 22 passes through rib 21b at hole 36b. Drive mechanism 26 includes a motor drive shaft gear 24, and gears 28a, 28b, and 28c which are rotatably mounted on stationary gear shafts 38a and 38b and are arranged to produce a proper torque to turn a cup mounting shaft 30. In this embodiment, cup mounting shaft 30 is integrally formed with gear 28c and includes a gear shaft socket 56, which loosely receives gear shaft 38b, and a post socket 54, which tightly receives post 34 of cup 32. The upper end of cup mounting shaft 30 passes through rib 21a at hole 36a. Post 34 is integrally joined to the bottom of cup 32. Cup 32 also includes a cup wall 35 that supports and contains a food portion 40, and a drip lip 33 that buffers runoff from food portion 40 from entering housing 20.

Figure 3:
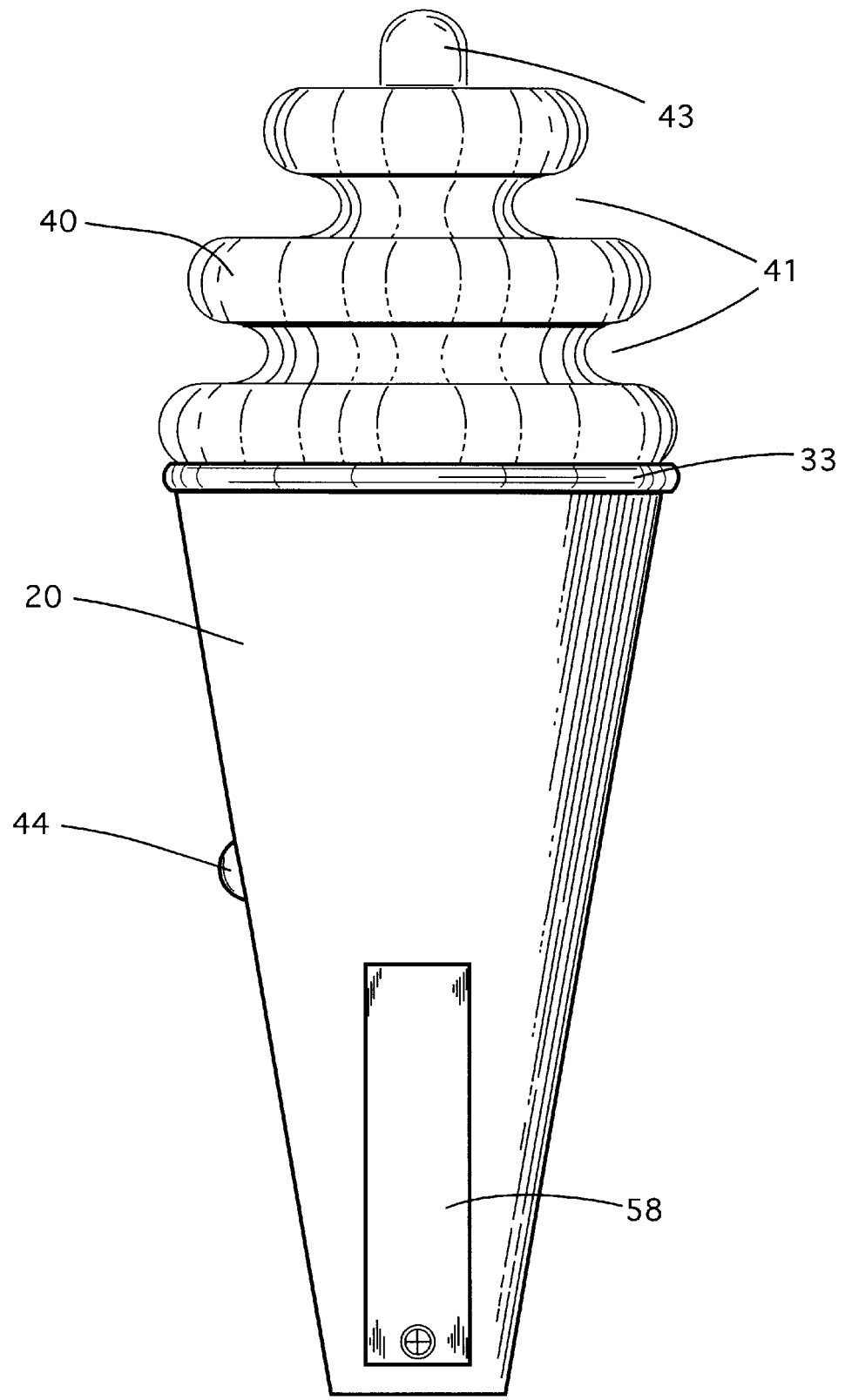
FIG. 3 is a full side view of the hand-held motorized cup spinner shown in FIG. 1 after horizontal channels and a knob have been formed on the periphery or outer surface of the food portion by a user's tongue, and showing a removable panel for battery installation.

FIG. 3 shows a full side view of the hand-held motorized cup spinner shown in FIG. 1 after horizontal channels 41 and a knob 43 have been sculpted in food portion 40 by a user's tongue, and including a removable panel 58 for battery installation.

Figure 4:
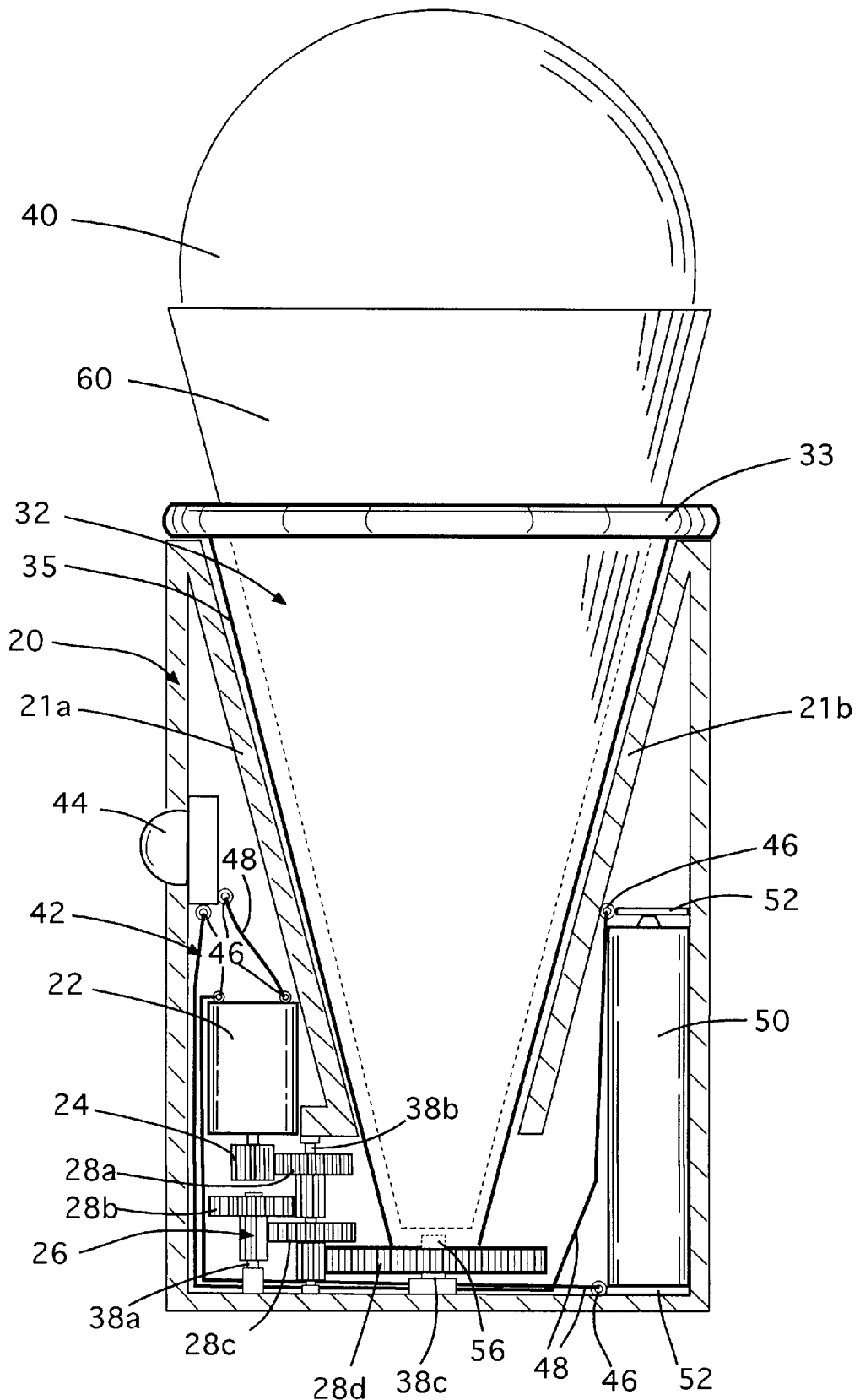
FIG. 4 is partial cross-section view of a hand-held motorized cup spinner adapted to receive an edible pastry cone filled with a food portion, in accordance with the present invention.
Figure 5:
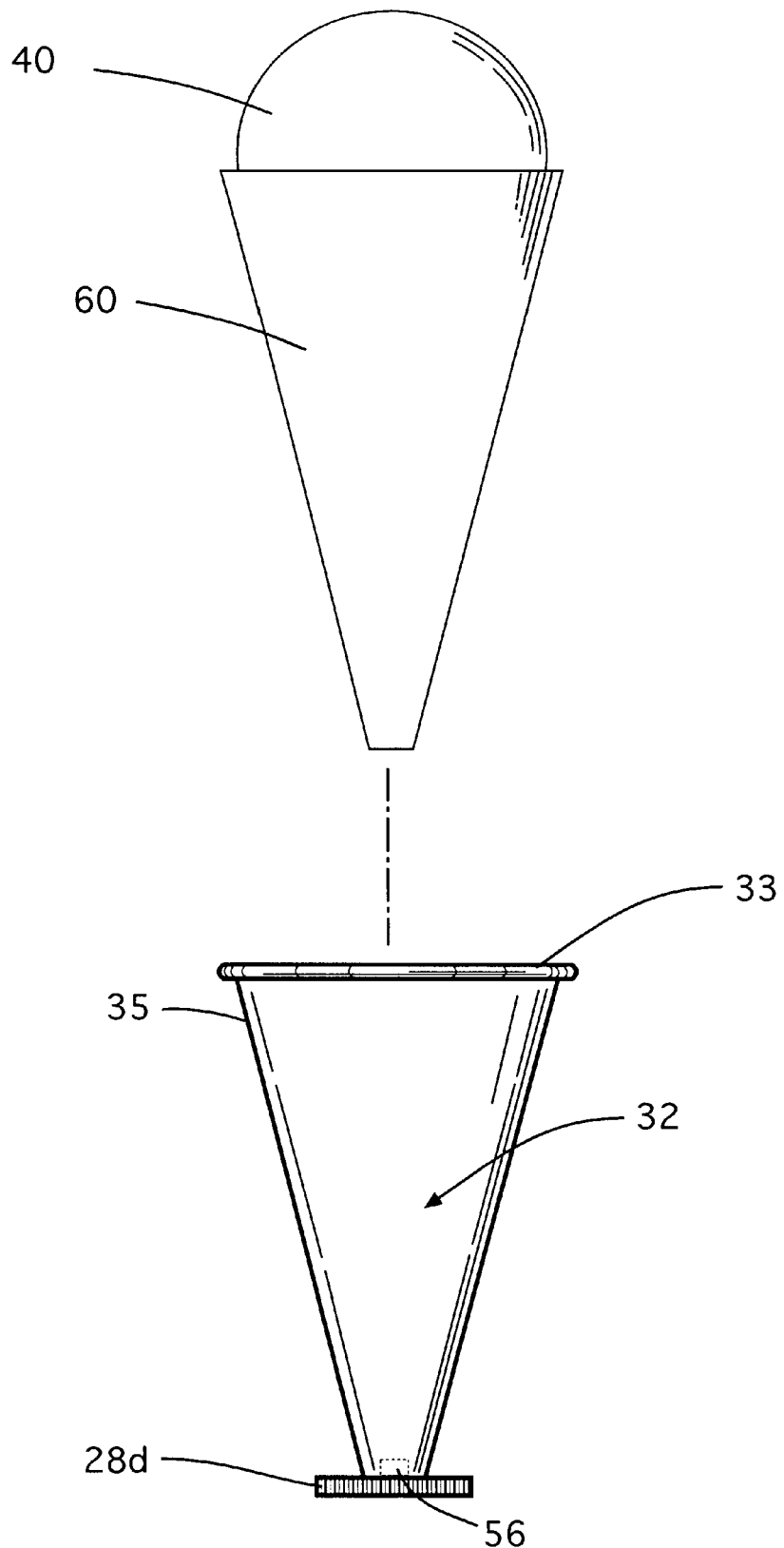
FIG. 5 is a full side view of the substantially cone-shaped cup with attached gear shown in FIG. 4, indicating how an edible pastry cone is received by the cone-shaped cup.

FIG. 4 and FIG. 5 show the internal features of another embodiment of the present invention. A cylindrically-shaped housing 20, with ribs 21a and 21b, supports and contains an electric circuit 42, a drive mechanism 26, and a substantially cone-shaped cup 32. Electric circuit 42 includes an electric motor 22, electrical contacts 46, switch 44, connecting wires 48, battery plates 52, and a battery 50. Drive mechanism 26 includes a motor drive shaft gear 24, and gears 28a, 28b, 28c and 28d which are rotatably seated on stationary gear shafts 38a, 38b and 38c and are arranged to produce a proper torque to turn cup 32. In this embodiment, cup 32 is integrally formed with gear 28d and is stabilized by gear shaft 38c which is received by gear shaft socket 56. Cup 32 also includes a cup wall 35, which supports and contains an edible pastry cone 60, and a drip lip 33. Pastry cone 60 supports and contains a food portion 40.

Figure 6:
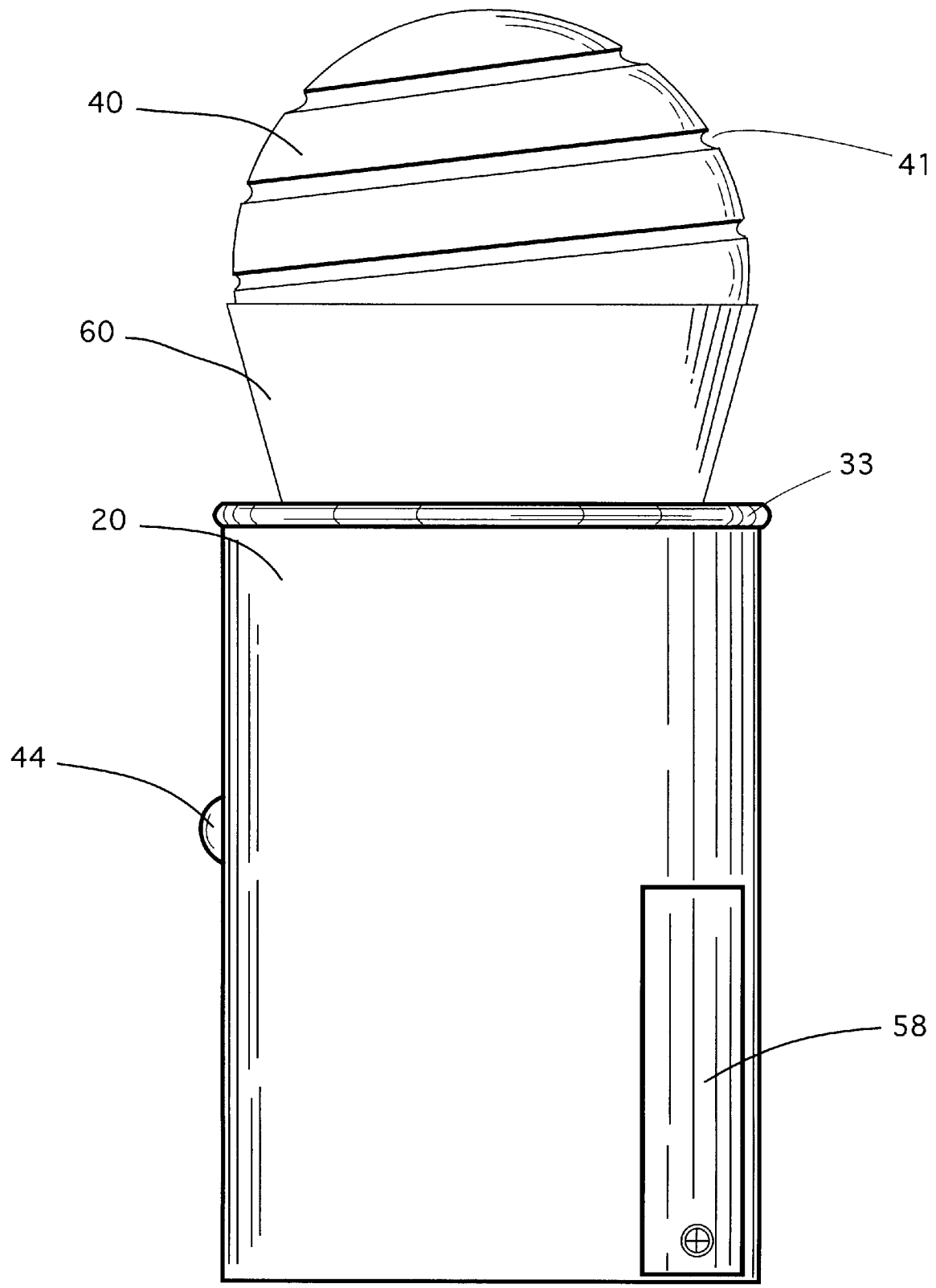
FIG. 6 is a full side view of the hand-held motorized cup spinner depicted in FIG. 4 after a spiral channel has been carved on the periphery or outer surface of the food portion by a user's tongue, and including a removable panel for battery installation.

FIG. 6 shows a full side view of the hand-held motorized cup spinner shown in FIG. 4 after a spiral channel 41 has been carved on the outer surface or periphery of food portion 40 by a user's tongue, and including a removable panel 58 for battery installation.

From the description above, a number of advantages of my motorized eating receptacle become evident:

(a) A hand-held motorized cup spinner for rotating a portion of ice cream or similar food against a person's tongue provides an entertaining new means for consuming such foods and makes the typical act of eating ice cream from a hand-held receptacle more creative and enjoyable.

(b) A hand-held motorized cup spinner formed in the shape of a traditional ice cream cone gives instant recognition to the purpose of such a device and increases its play, entertainment and promotional value.

(c) A detachable cup makes filling and washing such a cup simple and efficient and permits cups used by different individuals or containing different flavors to be used interchangeably upon a common hand-held motorized housing.

(d) A hand-held motorized cup spinner adapted to receive and support a common, edible pastry cone combines the novel experience of eating one's ice cream while it is spinning with the traditional experience of eating the pastry cone once its contents have been consumed.

(e) A hand-held motorized cup spinner for rotating a portion of ice cream on a motorized handle permits a person's outstretched tongue to interact with the ice cream in novel ways such as to sculpt channels in the periphery or outer surface of the ice cream, resulting in interesting shapes and patterns being formed.

(f) The materials of my invention are common and readily available and my design is relatively simple to use, easy to assemble and inexpensive to produce.

OPERATION—FIGS. 1, 2, 3, 4, 5, 6

To operate the hand-held motorized cup spinner illustrated in FIGS. 1, 2, and 3, a child or adult must first load a food portion 40 into cup 32 prior to consumption. This can be accomplished either while cup 32 is installed in housing 20, or while it is detached. In either case, cup wall 35 serves to support and contain food portion 40. If cup 32 is detached during filling, it should then be placed in housing 20 by guiding post 34 into cup socket 54 to form a tight, temporary fit. Housing 20 is then grasped in the user's hand so switch 44 can be comfortably pressed by one or more fingers. When the child or adult depresses switch 44, electric circuit 42 is completed, allowing electricity from battery 50 to flow through battery plates 52, electrical contacts 46, connecting wires 48, and electric motor 22. This causes electric motor 22 to begin turning which, in turn, activates drive mechanism 26. Motor drive shaft gear 24 begins turning and imparts rotation, in turn, on gears 28a, 28b, and 28c, which spin freely upon stationary gear shafts 38a and 38b. Cup mounting shaft 30, which is integrally connected to gear 28c and therefore turns at the same rate of speed as gear 28c, is stabilized on gear shaft 38b at gear shaft socket 56, and at hole 36a in rib 21a. As cup mounting shaft 30 rotates, it, in turn, imparts rotation upon post 34, cup 32 and, finally, food portion 40. As food portion 40 rotates, the user brings his or her tongue into contact with food portion 40 in order to lick and shape the material. The outer surface or periphery of food portion 40 continues to rotationally feed against the person's outstretched tongue for as long as switch 44 is depressed. Throughout operation, drip lip 33 on cup 32 serves to prevent runoff from food portion 40 from entering housing 20. After use, cup 32 may be detached from cup mounting shaft 30 by simply lifting cup 32 upward, thereby separating cup mounting shaft 30 and post 34. Cup 32 may then be placed in a dishwasher or sink for cleaning. In this embodiment, several cups used by different people or containing different flavors may be used interchangeably on a single hand-held housing 20.

The embodiment of my invention illustrated in FIGS. 4, 5, and 6 operates in a manner similar to the embodiment described above, with a few notable exceptions: An edible pastry cone 60 containing a food portion 40 is seated in the substantially cone-shaped cup 32 to form a tight, temporary fit. In this case, cup wall 35 serves to support and contain pastry cone 60, which, in turn, supports and contains food portion 40. Once again, housing 20 is grasped so switch 44 can be comfortably pressed by one or more fingers. When switch 44 is depressed, electric circuit 42 is completed, allowing electricity from battery 50 to flow through battery plates 52, electrical contacts 46, connecting wires 48, and electric motor 22. This causes electric motor 22 to begin turning which, in turn, activates drive mechanism 26. Motor drive shaft gear 24 begins turning and imparts rotation, in turn, on gears 28a, 28b, 28c and 28d, which spin freely upon stationary gear shafts 38a, 38b and 38c. Cup 32 in this embodiment is integrally connected to gear 28d and therefore turns, along with pastry cone 60 and ice cream portion 40, at the same rate of speed as gear 28d. As it rotates, cup 32 is stabilized on gear shaft 38c at gear shaft socket 56 and is laterally guided by ribs 21a and 21b of housing 20. As food portion 40 rotates, the user brings his or her tongue into contact with food portion 40 in order to lick and shape the material. The outer surface or periphery of food portion 40 continues to rotationally feed against the person's outstretched tongue for as long as switch 44 is depressed. Once again, throughout operation, drip lip 33 on cup 32 serves to prevent runoff from food portion 40 from entering housing 20. In this embodiment, pastry cone 60 can be eaten once food portion 40 has been substantially consumed.

It will be apparent that any number of licking techniques may be employed in consuming and shaping the outer surface or periphery of food portion 40 as it rotates in conjunction with cup 32, including: holding one's tongue stationary against food portion 40 to carve horizontal channels 41 as seen in FIG. 3; moving one's tongue slowly from bottom to top of food portion 40 while food portion 40 rotates in order to carve a spiral channel 41 as seen in FIG. 6, or pursing one's lips over the extreme top of food portion 40 to produce a knob 43 as seen in FIG. 3.

SUMMARY, RAMIFICATIONS AND SCOPE

Accordingly, the reader will see that, when operated, my invention provides a novel, versatile and previously unexploited type of device for consuming an individual portion of ice cream or similar food. A hand-held motorized cup spinner provides an entertaining alternative to traditional methods of eating such foods and expands the typical act of eating an ice cream cone to include numerous playful and creative possibilities including the sculpting and carving of channels with one's tongue to form interesting shapes and patterns on the outer surface of an ice cream portion. In addition, a hand-held motorized cup spinner shaped like a traditional ice cream cone is easy to hold and is easily recognizable, thereby increasing its entertainment and promotional value. Also, a detachable cup with a drip lip as shown in the present invention makes filling and rinsing such a cup easy and efficient, features which parents, especially, can appreciate. A detachable cup also permits several cups to be used interchangeably on a common hand-held motorized housing. An embodiment of my invention that is adapted to receive a common edible pastry cones filled with ice cream or similar food offers the user both the novelty of eating one's ice cream while it is spinning and the familiarity of eating the cone once its filling has been substantially consumed.

Lastly, my invention is extremely simple to use, is relatively inexpensive to produce, and appeals to a wide range of users, from very young children to adults.

Although the description above contains many specificities, these should not be construed as limiting the scope of the invention but as merely providing illustrations of some of the presently preferred embodiments of this invention. Many other variations are possible.

For example, the housing may be made of any durable material and may be formed or molded into any desired shape. The cup may be formed in any shape so long as its walls serve to support and contain the malleable food portion being consumed. The drive mechanism can include any number and combination of gears or other drive elements, so long as sufficient output torque and speed are produced. All forms of motion for the rotation of the cup are anticipated, for example, spin, rotate, vibrate, agitate, etc. Any method for temporarily coupling a detachable cup to the drive mechanism that adequately conveys the necessary torque from the drive mechanism to the cup may be used. The electrical circuit of my invention can include any number of batteries and any desired size battery may be used which is compatible with the motor. Any type of electrical switch for closing and opening the electric circuit may be used.

Accordingly, the scope of the invention should be determined not by the embodiment(s) illustrated, but by the appended claims and their legal equivalents.

I claim:

1. A novelty amusement eating device for supporting, containing, rotating and sculpting a food portion of malleable consistency during consumption comprising:
   a) a housing adapted to be grasped and supported by a person's hand, said housing being substantially cone-shaped simulating the appearance of a common edible pastry cone;
   b) a cup rotatable supported by said housing, said cup being adapted to receive and contain a food portion of substantially malleable consistency, said food portion having a periphery or outer surface; and c) a drive mechanism supported by said housing, said drive mechanism including rotating means for imparting a rotary motion upon said cup, said rotary motion providing feeding means for rotationally feeding said periphery of said food portion against a person's outstretched tongue.

2. The apparatus of claim 1 wherein said cup is detachable from said housing for simplified filling and cleaning of said cup and to permit more than one cup to be supported interchangeably by said housing.

3. The apparatus of claim 1 wherein said cup is adapted to receive and vertically support in a stable manner a common edible pastry cone.

4. The cup of claim 1 further including a lip or barrier for preventing runoff from said food portion from entering said housing.

5. The rotating means of claim 1 further including an electric circuit, said electric circuit including an electric motor, a source of electrical energy and a switching means for completing said electric circuit and activating said motor.

6. The electric circuit of claim 5 wherein said source of electrical energy consists of one or more batteries.

7. A hand-held apparatus for rotating a common edible pastry cone comprising:

a) a housing adapted to be grasped and supported by a person's hand;

b) a cup rotatably supported within and substantially surrounded by said housing, said cup being adapted to receive and vertically support in a stable manner a common edible pastry cone; and c) a drive mechanism supported by said housing, said drive mechanism including rotating means for imparting a rotary motion upon said cup, said rotary motion providing feeding means for rotationally feeding the contents of said common edible pastry cone against a person's outstretched tongue.

* * * * *